United States Patent [19]

Eida et al.

[11] 4,395,288

[45] Jul. 26, 1983

[54] LIQUID RECORDING MEDIUM

[75] Inventors: Tsuyoshi Eida, Chiba; Yasuhiro Yano, Tokyo; Masahiro Haruta, Funabashi; Yohji Matsufuji, Tokyo; Tokuya Ohta, Yokohama, all of Japan

[73] Assignee: Canon Kabushiki Kaisha, Tokyo, Japan

[21] Appl. No.: 365,731

[22] Filed: Apr. 5, 1982

Related U.S. Application Data

[63] Continuation of Ser. No. 54,489, Jul. 3, 1979, abandoned.

[30] Foreign Application Priority Data

Jul. 4, 1978 [JP] Japan .................................. 53-81122

[51] Int. Cl.³ .............................................. C09D 11/02
[52] U.S. Cl. ...................................... 106/22; 260/166
[58] Field of Search ............................. 106/20, 22, 23; 260/166

[56] References Cited

U.S. PATENT DOCUMENTS 4,184,881 1/1980 Bradley ................................. 106/22
4,269,627 5/1981 Hwang ................................. 106/22

Primary Examiner—John Kight, III
Assistant Examiner—Amelia B. Yarbrough

Attorney, Agent, or Firm—Fitzpatrick, Cella, Harper & Scinto

[57] ABSTRACT

A liquid recording medium for use in a recording process, wherein said recording medium is discharged from a discharge orifice in a recording head and spattered in the form of droplets for recording, and containing (a) a recording agent for forming recorded images and (b) a carrier liquid capable of dissolving or dispersing the recording agent. The recording agent is a compound having 2-8 sulfo groups per molecule and having the formula (A)

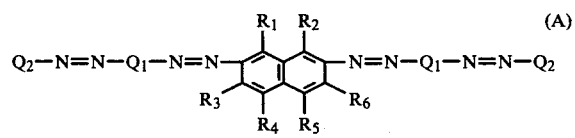

where the $Q_1$ radicals are similar or dissimilar members selected from phenylene and naphthylene, the $Q_2$ radicals are similar or dissimilar members selected from phenyl and naphthyl, the $Q_1$ radicals and the $Q_2$ radicals may be unsubstituted or amino substituted, hydroxyl substituted or sulfo substituted, $R_1$-$R_6$ are similar or dissimilar members selected from hydrogen, amino, hydroxyl and sulfo, and said sulfo groups as mentioned above are all in the form of sodium salt or quaternary ammonium salt.

18 Claims, No Drawings

LIQUID RECORDING MEDIUM

This is a continuation of application Ser. No. 54,489, filed July 3, 1979, now abandoned.

BACKGROUND OF THE INVENTION

1. Field of the Invention

This invention relates to liquid recording medium suitable for use in a recording method which performs image recording by ejecting and spattering the liquid recording medium in the form of droplets from an orifice of a nozzle onto a recording member. More particularly, the invention is concerned with a novel liquid recording medium with various properties of remarkable improvement such as stability and responsiveness of the droplets at their ejection from the discharge orifice, stability in storage over a long period of time, affinity for recording members, quality of the image to be recorded, and so forth.

2. Description of the Prior Arts

So-called non-impact recording methods having recently drawn public attention, because uncomfortable noises during the recording operation could be reduced to a negligible order. Among these particularly important is the so-called ink jet recording method which allows high-speed recording on a plain paper without particular image-fixing treatment, and, in this particular field, there have been proposed various approaches including those already commercialized, and others still under development.

Such ink jet recording method is to perform recording by spattering the liquid recording medium, or the so-called "ink", in the form of droplets and adhering the same onto the recording member.

Such ink used for jet recording method is required to have various characteristics depending upon the recording mode as well as characteristics essential to liquid recording medium for printing such as offset printing or writing.

With a view to satisfying such various conditions, there have heretofore been made various proposals. For instance, U.S. Pat. No. 4,106,027 discloses a liquid recording medium having a low viscosity of 5 c.p. or below and an electrical conductivity of $10^{-4}$ ohm$^{-1}$cm$^{-1}$ or above, and which is principally composed of an organic solvent. The liquid recording medium is used in a recording device of a type in which the droplets are charged. For the organic solvent, the prior patent uses, as its principal component, alkane or cycloalkane having the carbon content of from 5 to 8, lower alcohols, ethers (diethylether, dioxane, tetrahydrofuran), aromatic hydrocarbons, halogenated hydrocarbons, or esters. The recording agent components used in this system are solvent-soluble anthraquinone dyes, azo dyes, xanthene dyes, phenacine dyes, oxazine dyes and the like.

On the other hand, there have also been known many kinds of liquid medium component system containing water. For example, U.S. Pat. No. 3,687,887 discloses an aqueous system liquid recording medium consisting of an organic resin binder such as styrene-maleic anhydride, etc., ether of polyhydric alcohol (particularly, glycol), and a recording coloring agent (carbon black and dyestuff suspended in water) agent so as to obtain a recorded image having high image density and good image-fixing property on the image forming base such as gelatin, resin film, etc. The recording agent used here is a mixture of carbon black suspended in water and an orthochromatic dye (direct dye or acid dye).

Further U.S. Pat. No. 3,705,043 teaches a liquid recording medium consisting of a recording agent, a wetting agent (polyhydric alcohol, alkyl ether of polyhydric alcohol, or a mixture thereof), and water, with a view to obtaining an infrared ray absorptive image, exhibiting appropriate viscosity value over a long period of time, and not bringing about clogging of the discharge orifice. As the recording agent, there are disclosed infrared absorbers such as water-soluble nigrosine dyes, spirit-soluble nigrosines, modified water-soluble nigrosine dyes, water-dispersed carbon black and mixtures thereof.

U.S. Pat. No. 3,776,742 discloses an effective liquid recording medium having electric conductivity and surface tension of 35 to 70 dyn/cm, and consisting of a water soluble dyestuff, an electrically conductive substance (metal chlorides, etc.), a low molecular weight polyol, and a crystalline organic compound such as urea, etc. This aqueous system liquid recording medium is effective in quick image-fixing on a recording member such as paper which contains therein cellulose. As a water-soluble black dye, there may be mentioned direct dyes of a biphenyl derivative type, acid dyes of a metal complex type, reactive dyes having a pyrimidyl and the like.

However, it is considerably difficult to obtain a liquid recording medium capable of satisfying various requisites simultaneously, and there remain problems to be solved.

That is, this kind of recording method, i.e., ink jet recording method, comprises ejecting a liquid recording medium through a discharge orifice of a minute diameter (usually 10–20 μm) in a recording head and spattering in the form of droplets for recording, and therefore, it is necessary that the method is of high signal responsiveness and high fidelity reproduction.

In addition, there are requested various characteristics, that is, the liquid recording medium can pass through a nozzle at a speed corresponding to the recording speed; after recording, the liquid recording medium can be rapidly fixed to the recording member; after fixed, the recorded images are of high light resistance, high water resistance and high weatherability; the recorded images have a sufficient density; the shelf life is long; there occurs no clogging in orifices and nozzles; and so on.

When an electric or electrostatic method is employed to form or control the liquid droplets, electric or electrostatic property of the liquid recording medium should be appropriately selected. In order to satisfy those conditions, viscosity, surface tension, resistivity, electric capacity, dielectric constant and the like of the liquid recording medium are appropriately adjusted.

The liquid recording medium is fundamentally composed of two components, that is, a recording agent which serves to form recorded images and a carrier liquid which carries the recording agent. However, in practice, a recording agent affects the characteristics of the liquid recording medium to a great extent and therefore, it is very difficult to obtain a liquid recording medium of desired characteristics by using only two components.

Therefore, various additives are added as third components so as to adjust, for example, viscosity, surface tension, resistivity and the like.

However, it is not easy to adjust each of the various characteristics independently by adding the third component. For example, when a viscosity adjusting additive is added to a liquid recording medium which surface tension is adjusted to a desired value, for the purpose of adjusting the viscosity, the other physical properties, in particular, surface tension, are changed sometimes.

Even if desirable characteristics of a liquid recording medium are obtained when it is prepared, it is often very difficult to maintain such desirable characteristics at the time of preparation after long use, long storage or long allowing to stand.

In particular, concentration of non-volatile components such as the recording agent and the like increases as a result of vaporization of carrier liquid components and thereby the physical properties such as surface tension and the like vary to a great extent sometimes. As the result, good recording can not be effected and further, sometimes liquid droplets can not be formed at all because the liquid path in the device is clogged.

In addition, it is desired to select density of recorded images at a wide range, or to select concentration of the recording agent in the liquid recording medium at a wide range without varying physical properties of the liquid recording medium for the purpose of improving reproducibility of half tones, sharpness and the like.

In case of conventional recording agents, the concentration greatly affects surface tension which has a great effect on various important characteristics such as ejection stability, liquid droplet forming property, flowability in the conduit of the device, signal responsiveness and the like. Therefore, it is necessary to control the physical properties at each time when the liquid recording medium is prepared with a different concentration of the recording agent.

Therefore, the recording agent should be such material that does not affect physical properties, in particular, surface tension, of the liquid recording medium upon adding or changing the concentration. In addition, the recording agent should have excellent light resistance, weatherability, fixability to recording members and high sharpness and further a property that it does not precipitate by crystallization or coagulation.

SUMMARY OF THE INVENTION

According to the present invention, there is provided a liquid recording medium for used in a recording process, wherein said recording medium is discharged from a discharge orifice in a recording head and spattered in the form of droplets for recording, and containing (a) a recording agent for forming recorded images and (b) a carrier liquid capable of dissolving or dispersing the recording agent, characterized in that said recording agent is a compound having 2–8 sulfo groups per molecule and having the formula (A)

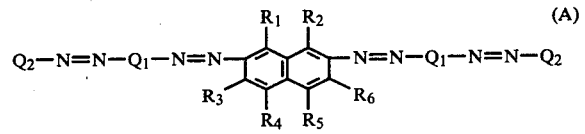

where the $Q_1$ radicals are similar or dissimilar members selected from phenylene and naphthylene, the $Q_2$ radicals are similar or dissimilar members selected from phenyl and naphthyl, the $Q_1$ radicals and the $Q_2$ radicals may be unsubstituted or amino substituted, hydroxyl substituted or sulfo substituted, $R_1$–$R_6$ are similar or dissimilar members selected from hydrogen, amino, hydroxyl, and sulfo, and said sulfo groups as mentioned above are all in the form of sodium salt or quaternary ammonium salt.

An object of the present invention is to provide a liquid recording medium comprising a recording agent which does not or hardly affects the liquid physical properties, in particular, surface tension, of the liquid recording medium and has an excellent light resistance, weatherability, image density and fixability and neither crystallizes nor coagulates in the carrier liquid.

Another object of the present invention is to provide a liquid recording medium comprising a recording agent, a dye compound as represented by the formula (A) above which shows excellent signal responsiveness, stability of forming liquid droplets, stability of ejection, fluidity in the conduit, fixability to a recording member and can be continuously fed through a nozzle for a long time at a speed sufficiently corresponding to the recording speed.

A further object of the present invention is to provide a liquid recording medium which can produce recorded images of excellent light resistance, weatherability, water resistance, high image density and high sharpness, and free from satelite dot.

Still another object of the present invention is to provide a liquid recording medium which contains, as a recording agent, the compound (A) which does not substantially affect physical properties, in particular, surface tension, of the liquid recording medium excluding the compound (A).

DESCRIPTION OF THE PREFERRED EMBODIMENTS

According to the present invention a dye compound used as the recording agent is a compound of the formula (A) above.

It is preferable that the central naphthalene ring (2,7-naphthylene) of compound (A) has sulfo groups in the form of sodium salt or quaternary ammonium salt at the symmetrical positions. For example, it is preferably that the central naphthalene ring has a sulfo group in the form of sodium salt or quaternary ammonium salt at the 3- and 6-positions, and amino and hydroxyl groups at the 1- and 8-positions, respectively.

The compound (A) usually has 2–8 sulfo groups, preferably 3–8 sulfo groups. More preferably, at least one of $Q_1$ and $Q_2$ has a sulfo group. And further it is preferable that the central naphthalene ring has sulfo groups all at the same side with respect to the long molecular axis of compound (A) and hydroxyl or amino groups at the opposite side with respect to the long molecular axis.

The liquid recording medium containing a compound (A) having such substituents shows excellent results.

As $Q_1$ radicals, unsubstituted or substituted phenylene groups, or sulfo (in the form of sodium salt or quaternary ammonium salt) substituted phenylene groups are preferable. When sulfo group is in the form of quaternary ammonium salt, solubility of compound (A) in a carrier liquid composed of water and a solvent other than water such as a water-soluble solvent, for example, alcohols, is advantageously higher than the solubility of compound (A) having the sulfo group in the form of sodium salt.

With respect to the structure of quaternary ammonium salt of sulfo group, it is preferable that hydrogen atom(s) adjacent to the N atom is substituted by $C_1$–$C_5$ alkyl, —$C_2H_4OH$ or

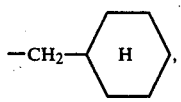

and in particular, 1–3 hydrogen atoms adjacent to the N atom are substituted by the above mentioned radicals.

An amount of the dye of compound (A) to be used may be optionally determined depending upon the desired density of recorded images, type of recording system, kinds of other additives, desired liquid physical properties and the like. The amount is usually 0.1–15% by weight of the total amount of the liquid recording medium, preferably 0.5–10% by weight and more preferably 1–5% by weight.

The dye of compound (A) as the recording agent used in the present invention does not or hardly affect the liquid physical properties, in particular, surface tension. Therefore, if physical properties of a liquid recording medium composed of various components except the compound (A) are preliminarily adjusted to desired values and then the compound (A) is added in various amounts, it is possible to obtain liquid recording media having desired concentration of the recording agent without changing the originally produced physical properties.

Representative compounds (A) as the recording agent may be mentioned as shown below, dye compound Nos. 1–81, where

represents benzene ring,

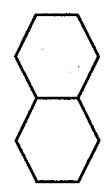

represents naphthalene ring and

represents cyclohexane ring.

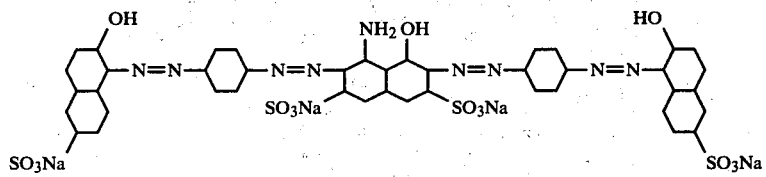

No. 1

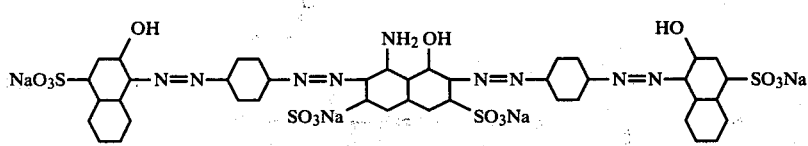

No. 2

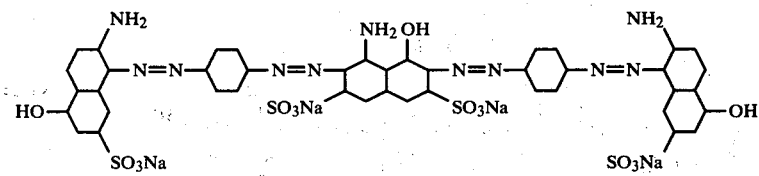

No. 3

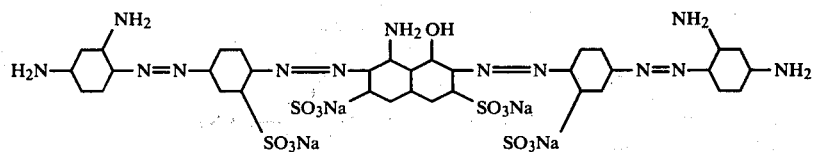

No. 4

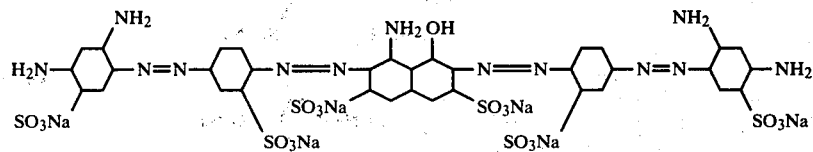

No. 5

-continued
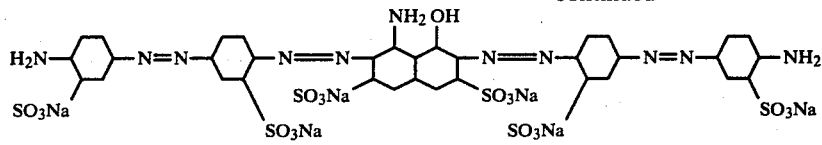 No. 6
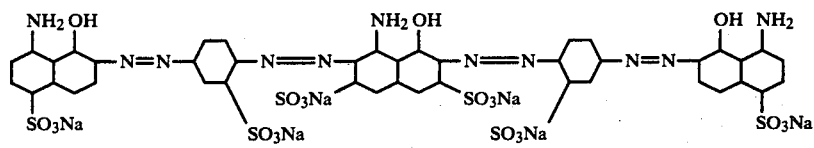 No. 7
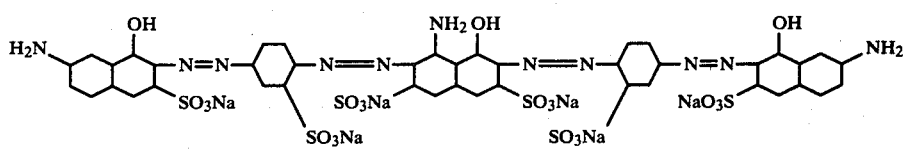 No. 8
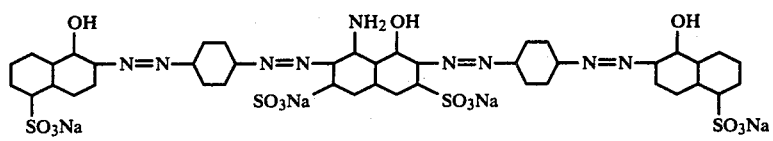 No. 9
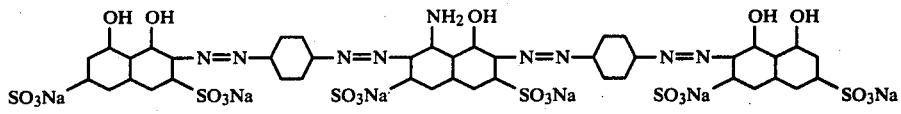 No. 10
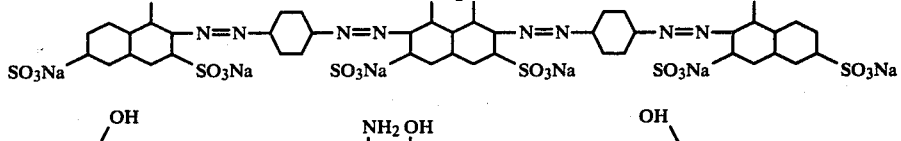 No. 11
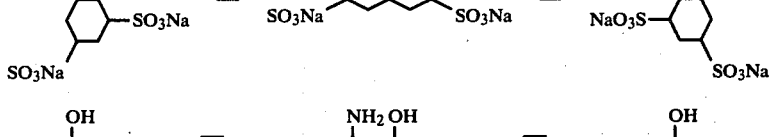 No. 12
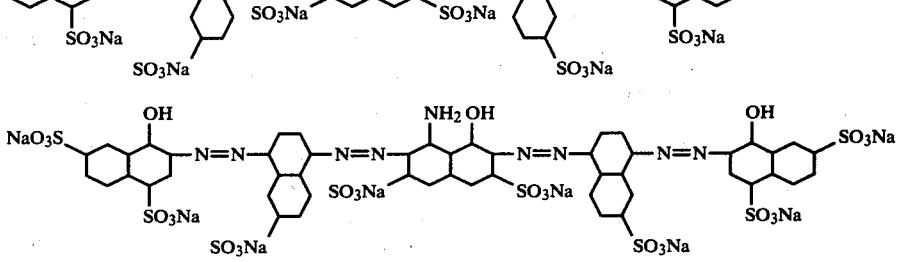 No. 13
No. 14
No. 15
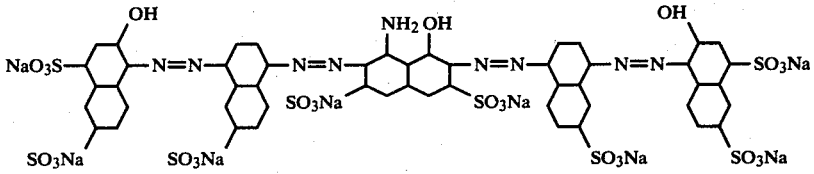 
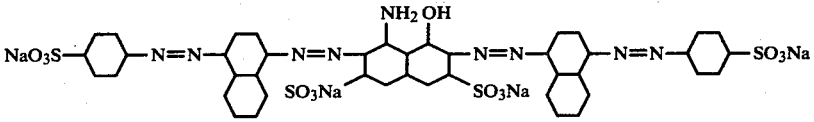 No. 16

-continued
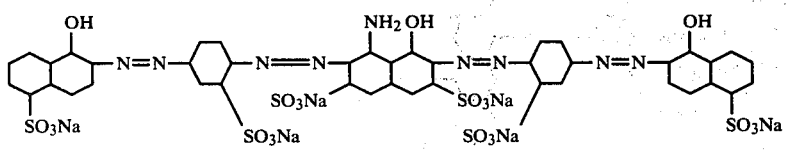
No. 17
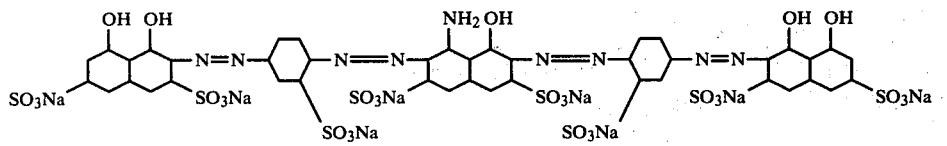
No. 18
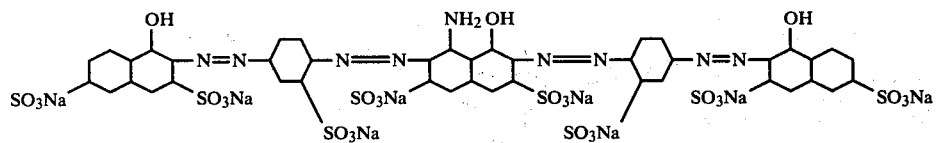
No. 19
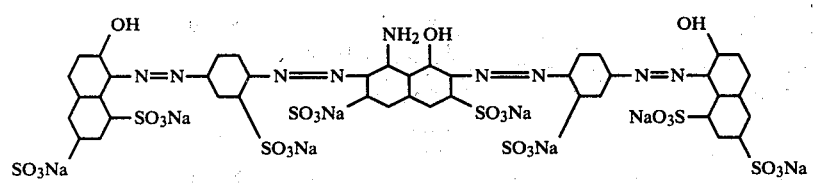
No. 20
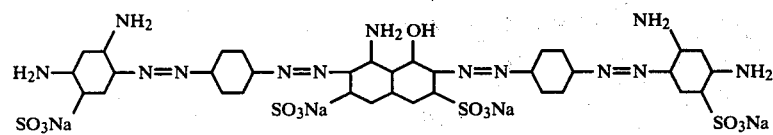
No. 21
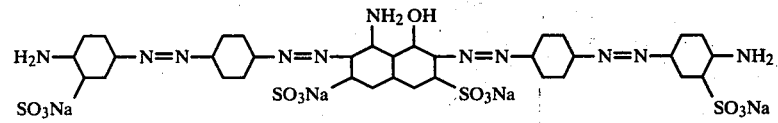
No. 22
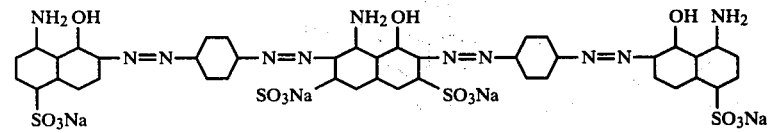
No. 23
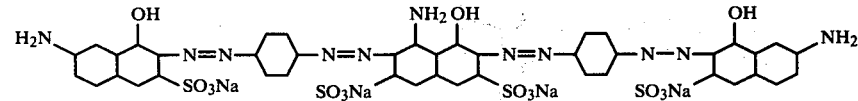
No. 24
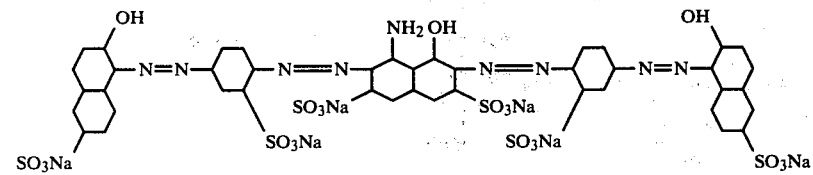
No. 25
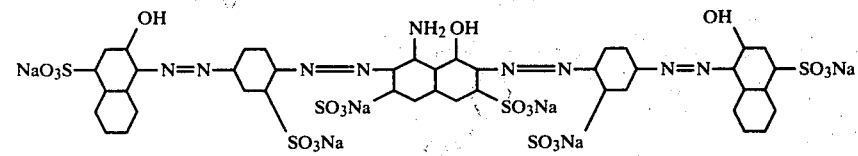
No. 26

-continued
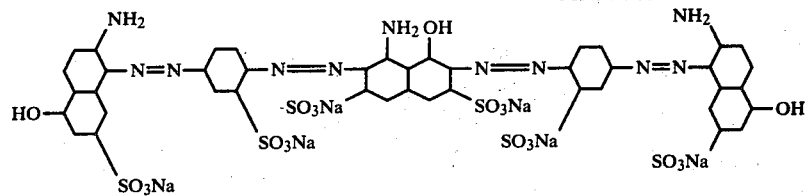 No. 27
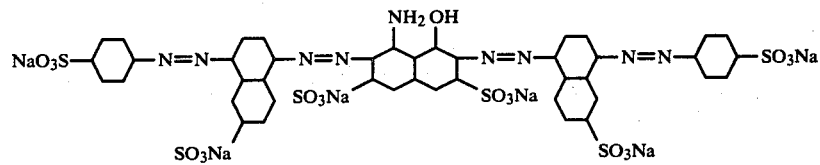 No. 28
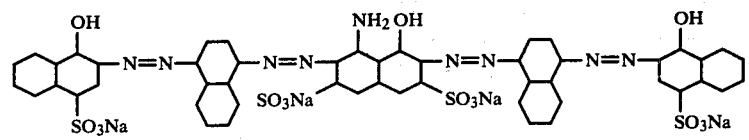 No. 29
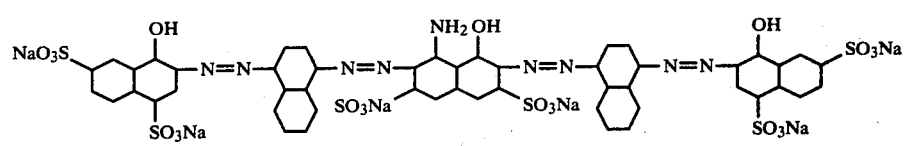 No. 30
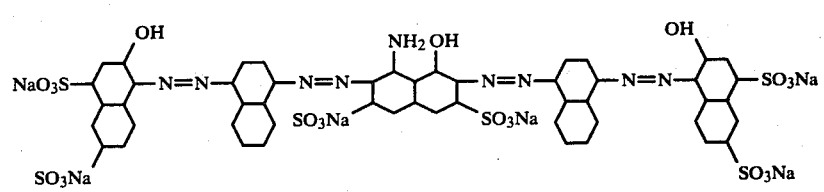 No. 31
 No. 32
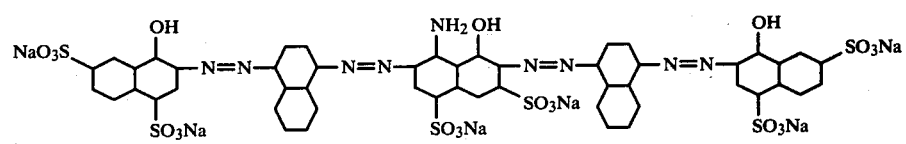 No. 33
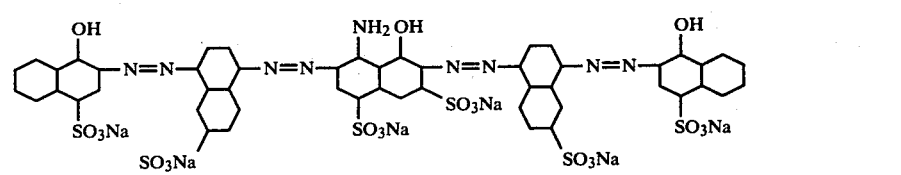 No. 34
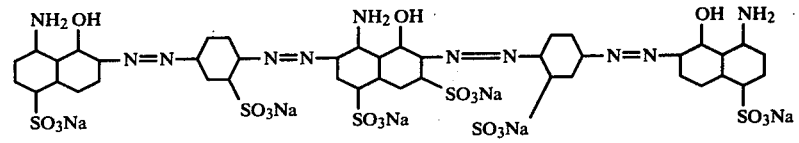 No. 35
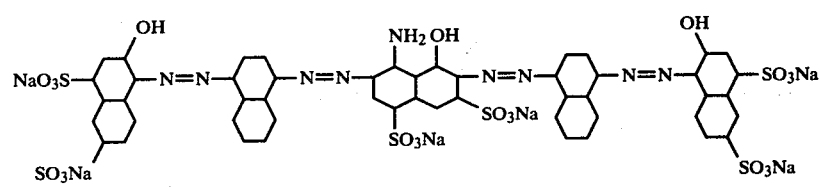 No. 36

-continued
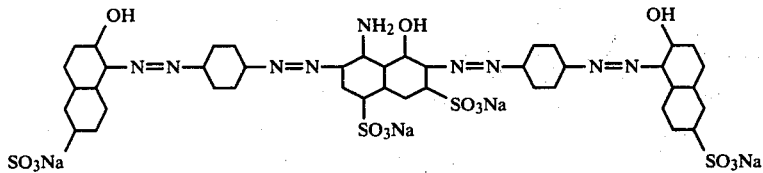 No. 37
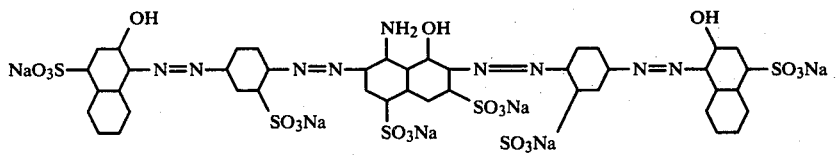 No. 38
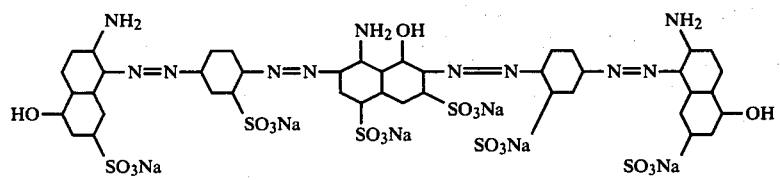 No. 39
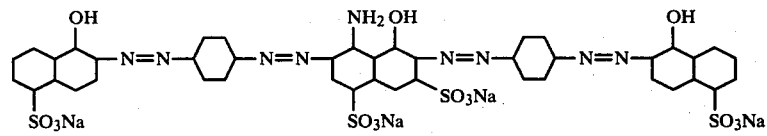 No. 40
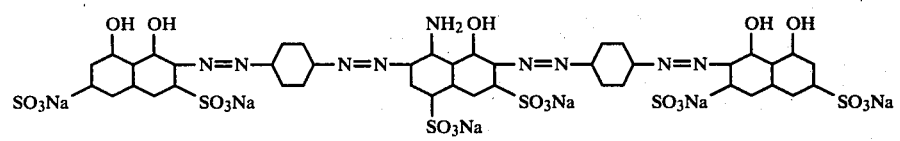 No. 41
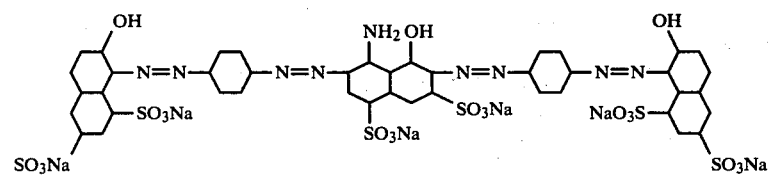 No. 42
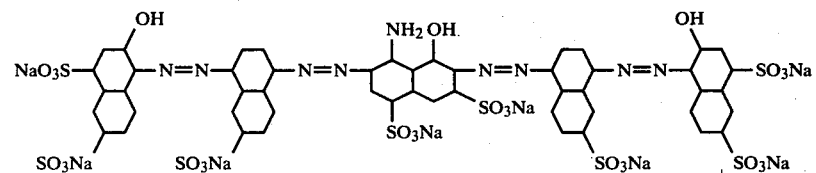 No. 43
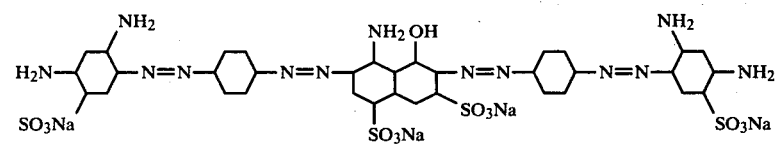 No. 44
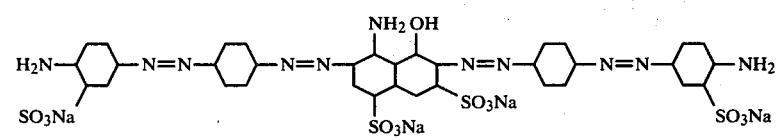 No. 45
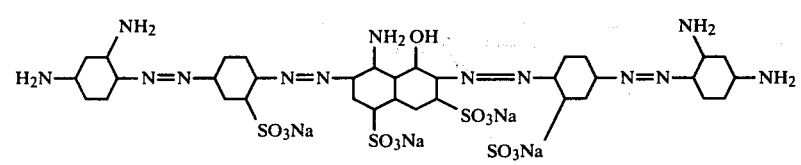 No. 46

-continued
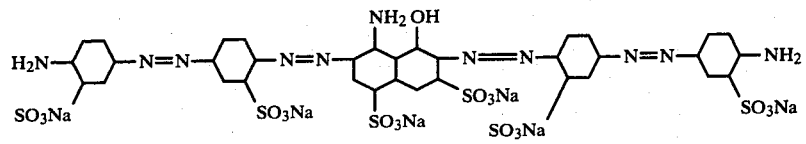 No. 47
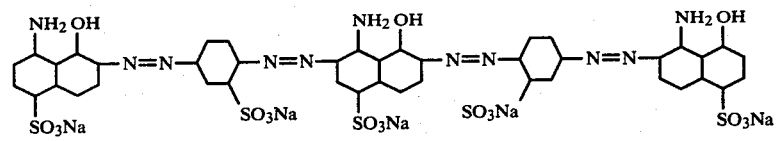 No. 48
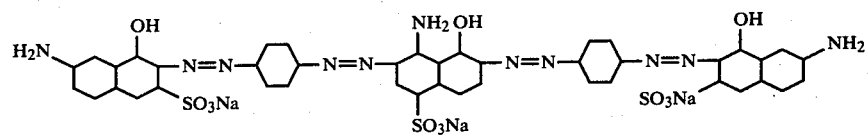 No. 49
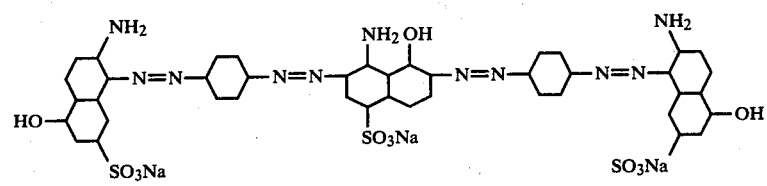 No. 50
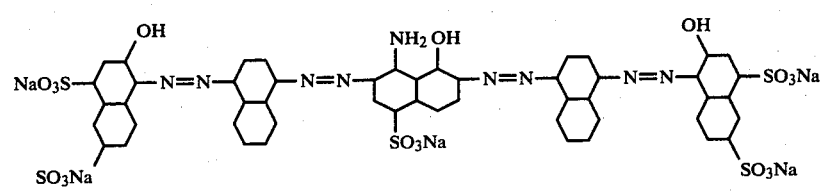 No. 51
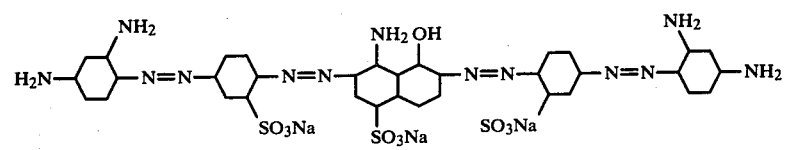 No. 52
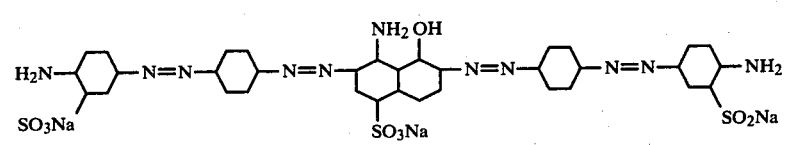 No. 53
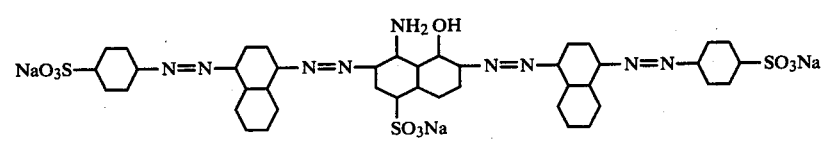 No. 54
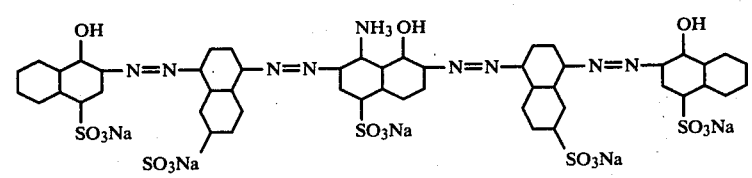 No. 55
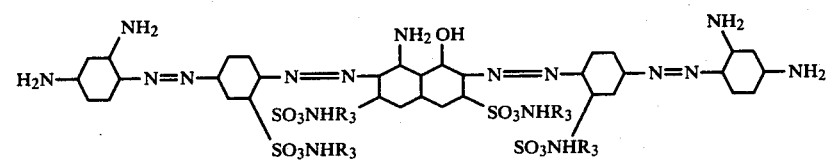 No. 56
R = —CH$_3$

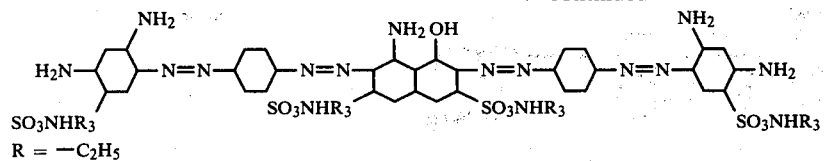
No. 57
R = —C$_2$H$_5$
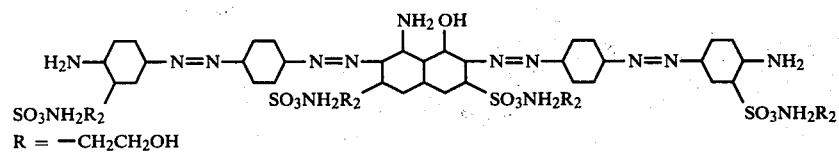
No. 58
R = —CH$_2$CH$_2$OH
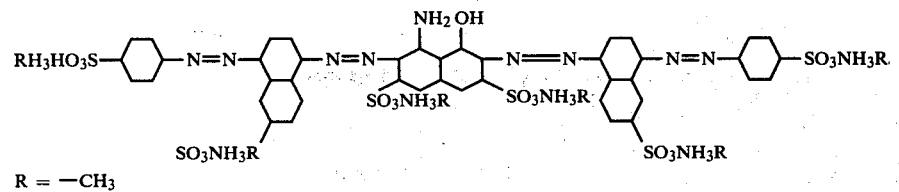
No. 59
R = —CH$_3$
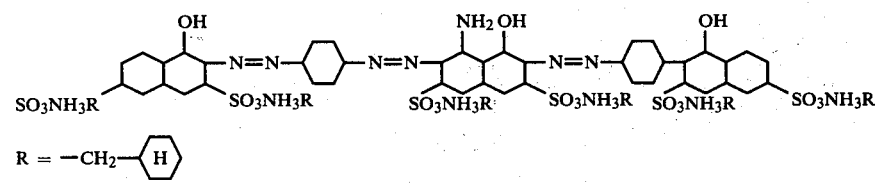
No. 60
R = —CH$_2$—(H)
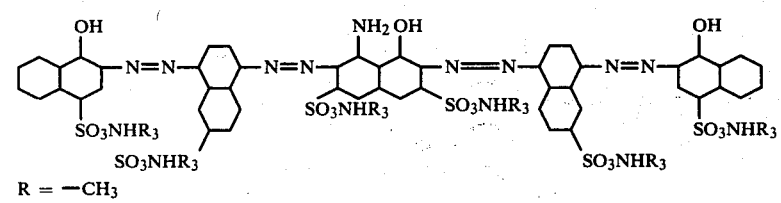
No. 61
R = —CH$_3$
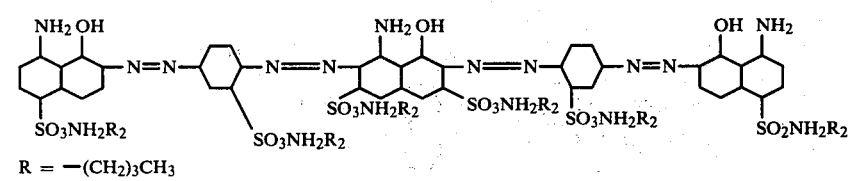
No. 62
R = —(CH$_2$)$_3$CH$_3$
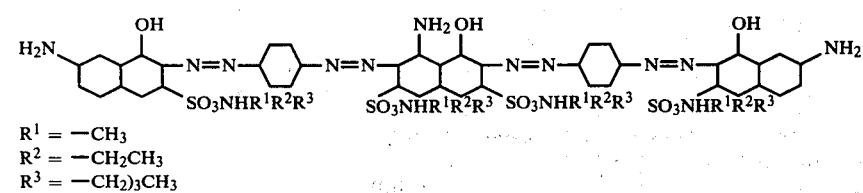
No. 63
R$^1$ = —CH$_3$
R$^2$ = —CH$_2$CH$_3$
R$^3$ = —(CH$_2$)$_3$CH$_3$
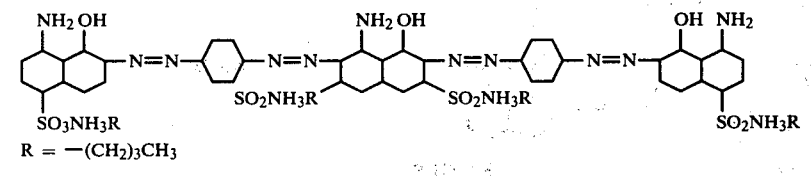
No. 64
R = —(CH$_2$)$_3$CH$_3$
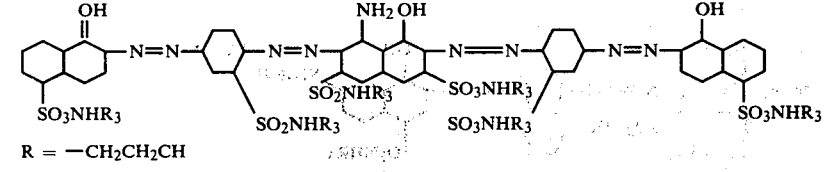
No. 65
R = —CH$_2$CH$_2$CH

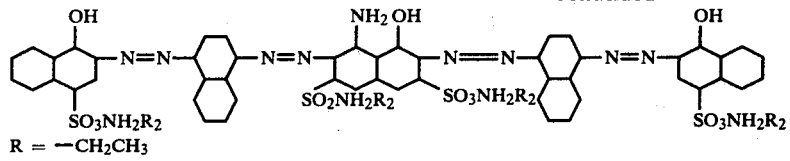
No. 66
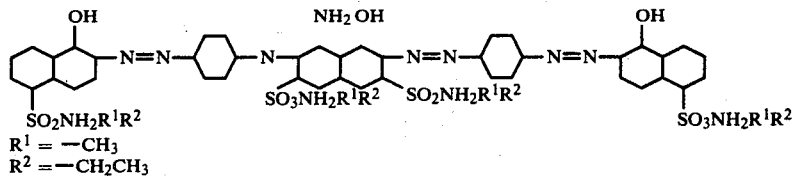
No. 67
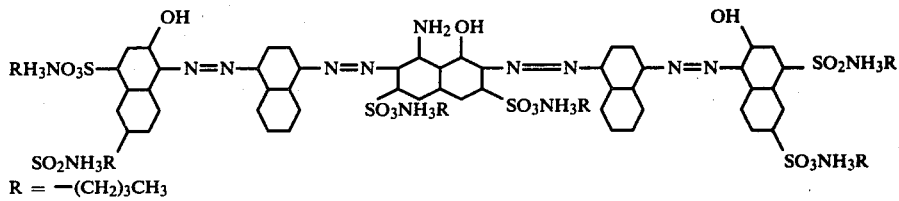
No. 68
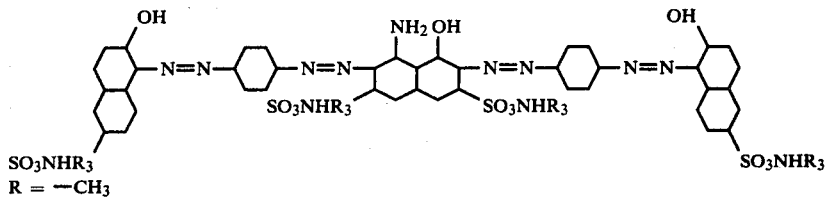
No. 69
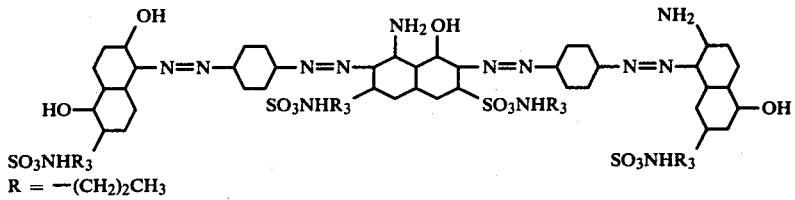
No. 70
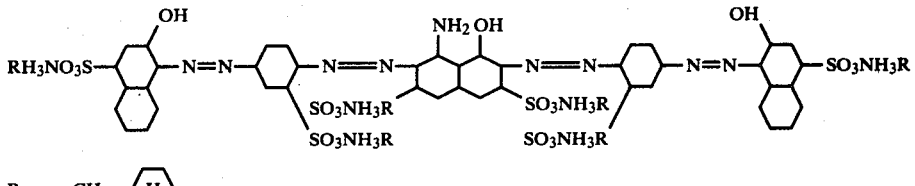
No. 71
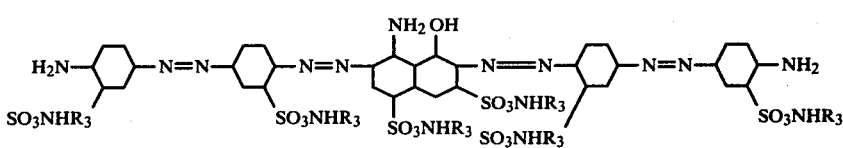
No. 72
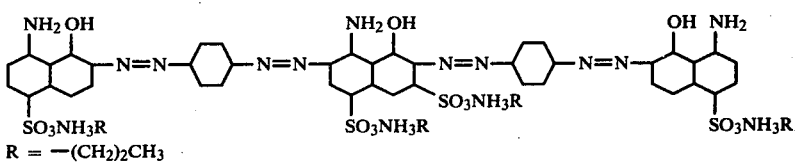
No. 73
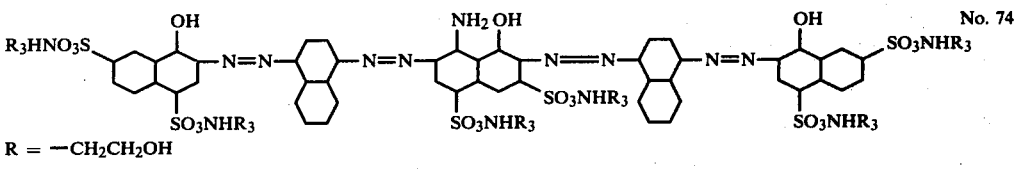
No. 74

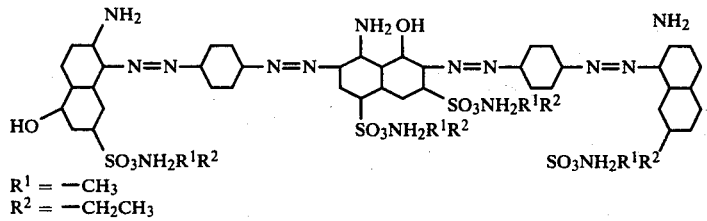

No. 75

$R^1 = -CH_3$
$R^2 = -CH_2CH_3$

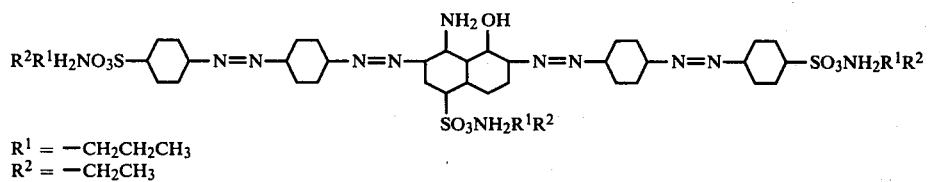

No. 76

$R^1 = -CH_2CH_2CH_3$
$R^2 = -CH_2CH_3$

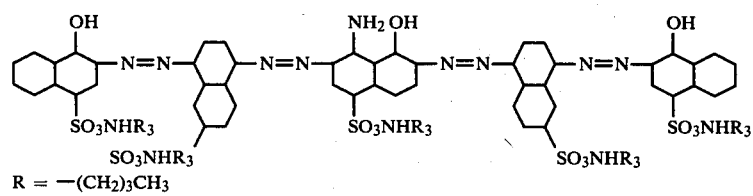

No. 77

$R = -(CH_2)_3CH_3$

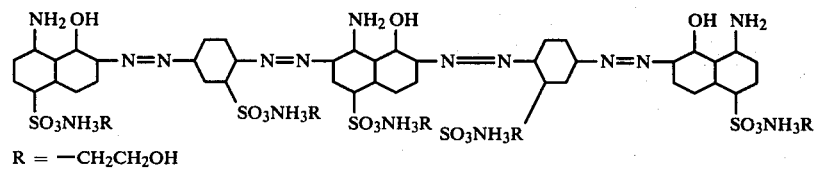

No. 78

$R = -CH_2CH_2OH$

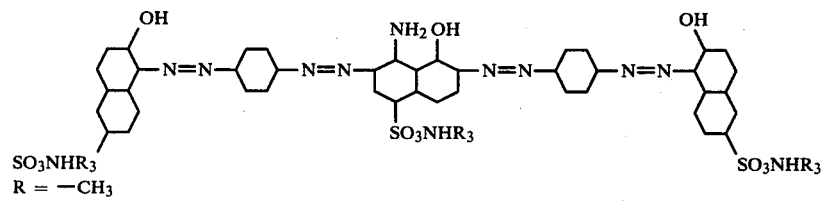

No. 79

$R = -CH_3$

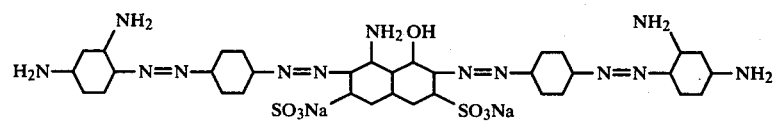

No. 80

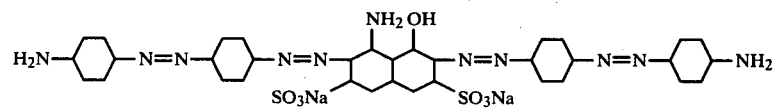

No. 81

Among the dye compounds No. 1–No. 81 (polyazo dyes), dye compound No. 80 is known as C.I. Direct Black 19 (C.I. 35255).

These dye compounds may be prepared by the methods of synthesis as disclosed in "Senryo Binran" (Handbook of Dyes), page 382, published by Maruzen K. K., Japan, Oct. 30, 1974: "Riron, Seizo, Senryo Kagaku" (Dye Chemistry-Theory and Practice), page 587, published by Gihodo, Japan, July 15, 11968, and the like.

As are well known in the art of organic synthesis, these methods are carried out by subjecting naphtholamines and aromatic amines (e.g. aniline, naphthylamine or derivatives thereof) corresponding to the end products, i.e., the desired dye compounds, to diazotization and coupling.

For example, dye compound No. 80 above may be produced by using H-acid, p-nitroaniline and m-phenylenediamine well known as dye intermediates and following the procedures shown below.

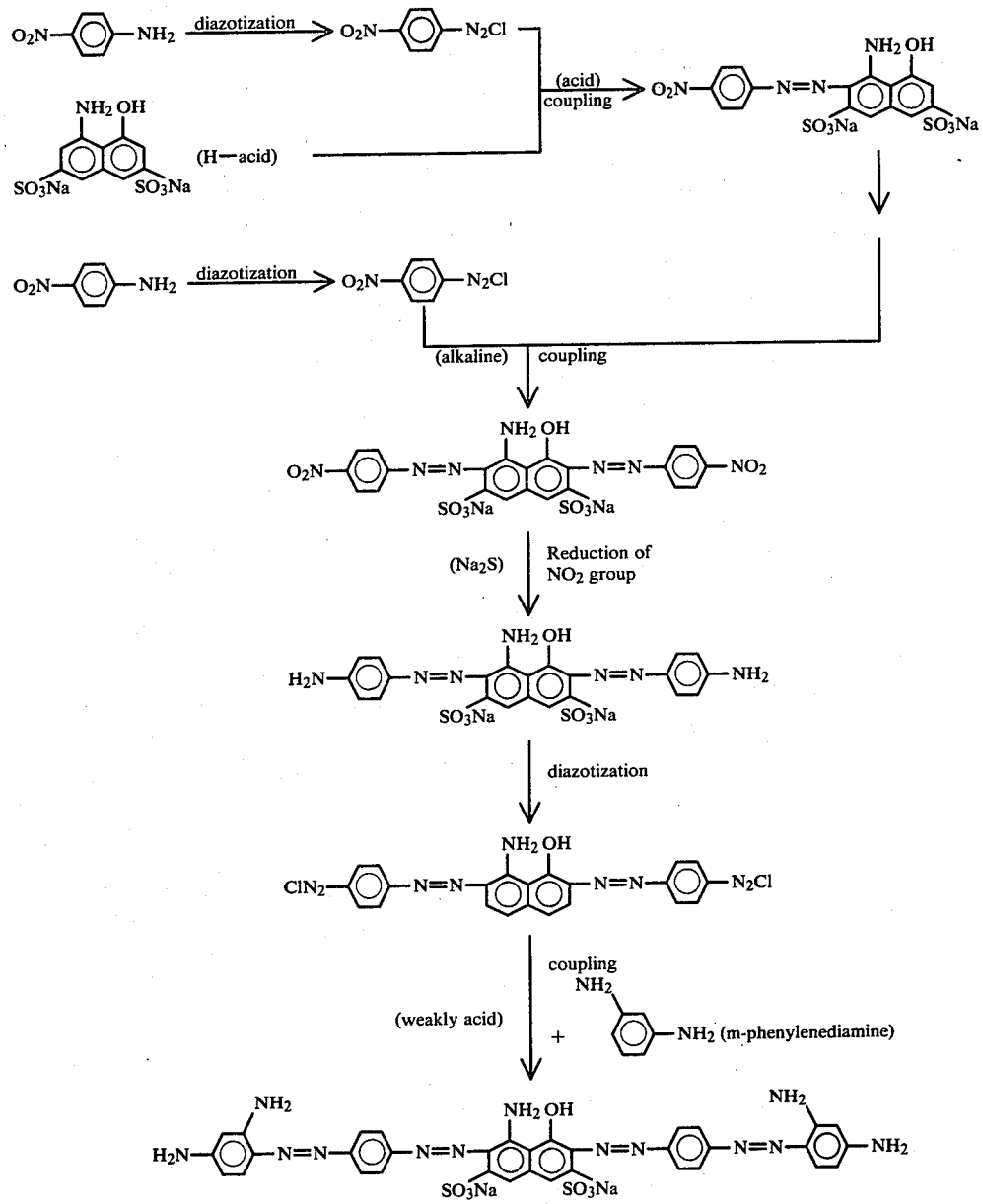
Repeating the above mentioned method except that
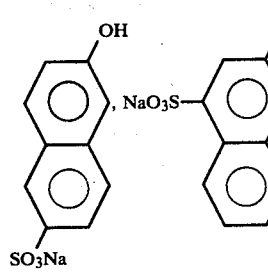
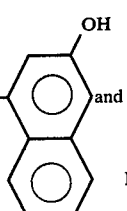
are used in place of m-phenylenediamine, there are obtained dye compound No. 1–No. 3, respectively.
When naphthylamine such as
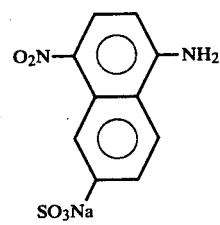
is used in place of p-nitroaniline and

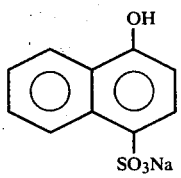

is used in place of m-phenylenediamine, dye compound No. 13 is obtained.

Further, as known in the art of organic synthesis, when the dye compounds thus obtained are precipitated in a strongly acidic aqueous solution ($SO_3Na$ group is converted to $SO_3H$ group) and an amine is added thereto in an alcohol solvent to produce a salt compound of Nos. 56–71 (quaternary ammonium salt).

For example, dye compound 56 is obtained as shown below:

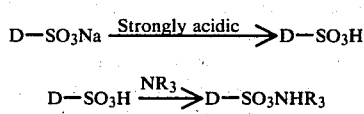

where D stands for the basic structure of the dye and R is methyl.

In a similar way, dye compound Nos. 32–47 may be produced from K-acid

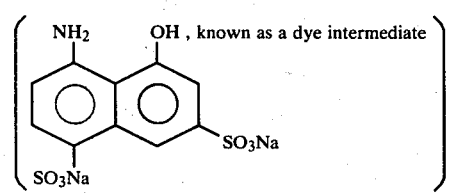

as an aminonaphthol, and appropriate aromatic amines.

When these compounds are converted to quaternary ammonium salts to produce salt compounds of a type of No. 72–No. 75.

Further, dye compound Nos. 48–55 may be produced from

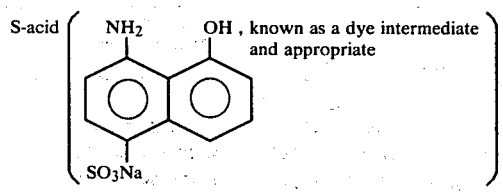

aromatic amines. When these compounds are converted to quaternary ammonium salts to produce salt compounds of a type of dye compound Nos. 76–79.

Among the above mentioned dye compounds, dye compound Nos. 1–31 and 5–71 are preferable because the liquid recording medium containing one of those compounds shows a good fixability to recording members and less change of physical properties of the liquid caused by change of concentration of the recording agent.

The liquid recording medium according to the present invention fundamentally comprises a dye compound represented by the formula (A) (supra) (recording agent) and a carrier liquid for dissolving or dispersing the recording agent.

As the carrier liquid used in the present invention, there may be mentioned water and a mixture of water and a water-soluble organic solvent, preferably, content of water being more than that of the water-soluble organic solvent in the mixture.

Representative examples of such water-soluble organic solvents are alkyl alcohols having 1 to 4 carbon atoms such as methyl alcohol, ethyl alcohol, n-propyl alcohol, iso-propyl alcohol, n-butyl alcohol, sec-butyl alcohol, tert-butyl alcohol, iso-butyl alcohol, etc.; amides such as dimethyl formamide, dimethyl acetamide, etc.; ketones or ketone alcohols such as acetone, diacetone alcohol, etc.; ethers such as tetrahydrofuran, dioxane, etc.; and substituted pyrrolidones such as N-methyl-2-pyrrolidone etc.

An amount of the water-soluble organic solvent is selected in such a way that it does not adversely affect the resulting liquid recording medium.

The amount of water-soluble organic solvent to be mixed with water is appropriately determined depending upon an amount of the recording agent, type of the organic solvent and type and amount of third components (infra) which may be added if desired, and the amount of water-soluble organic solvent is usually less than 0.7 parts by volume, preferably less than 0.5 parts by volume, per 1 part by volume of water.

Third components may be added to the liquid recording medium so as to control more appropriately the recording agent and physical properties of the liquid.

As the third components for adjusting physical properties of the liquid to desirable ranges, there may be mentioned viscosity regulating agents, surface tension regulating agents, pH regulating agents, resistivity regulating agents and the like, and further wetting agent and anti-fungal may be added to improve the liquid recording medium further.

Such viscosity regulating agent and surface tension regulating agent are added principally for achieving a flowability in the nozzle at a speed sufficiently responding to the recording speed, for preventing dropping of recording medium from the orifice of nozzle to the external surface thereof, and for blotting (widening of spot) on the record-receiving member.

For these purposes any known viscosity regulating agent or surface tension regulating agent is applicable as long as it does not provide undesirable effect to the carrier liquid and recording material.

Examples of such viscosity regulating agent are polyvinyl alcohol, hydroxypropyl cellulose, carboxymethyl cellulose, hydroxyethyl cellulose, methyl cellulose, watersoluble acrylic resins, polyvinylpyrrolidone, gum Arabic, starch etc.

The surface tension regulating agents effectively usable in the present invention include anionic, and nonionic surface active agents, such as polyethyleneglycolether sulfate, ester salt etc.—as the anionic compound; and polyoxyethylenealkylether, polyoxyethylenealkylphenylether, polyoxyethylenealkylesters, polyoxyethylenesorbitan alkylester, polyoxyethylene alkylamines etc. as the nonionic compound. In addition to the above-mentioned surface active agents, there can be effectively employed other materials such as amine acids such as diethanolamine, propanolamine, morphole etc., basic compounds such as ammonium hydroxide, sodium hydroxide etc.

These surface tension regulating agents may also be employed as a mixture of two of more compounds so as to obtain a desired surface tension in the prepared recording medium and within a limit that they do not undesirably affect each other or affect other constituents.

The amount of said surface tension regulating agent is determined suitably according to the species thereof, species of other constituents and desired recording characteristics, and is generally selected, with respect to 1 part by weight of recording medium, in a range from 0.0001 to 0.1 parts by weight, preferably from 0.001 to 0.01 parts by weight.

The pH regulating agent is added in a suitable amount to achieve a determined pH value thereby improving the chemical stability of prepared recording meidum, thus avoiding changes in physical properties and avoiding sedimentation a prolonged storage.

As the pH regulating agent adapted for use in the present invention, there can be employed almost any materials capable of achieving a desired pH value without giving undesirable effects to the prepared liquid recording medium.

Examples of such pH regulating agent are lower alkanolamine monovalent hydroxides such as alkali metal hydroxide, ammonium hydroxyde etc.

In case the recording is achieved by charging the droplets of liquid recording medium, the resistivity thereof is an important factor for determining the charging characteristics. In order that the droplets can be charged for achieving a satisfactory recording, the liquid recording medium is to be provided with a resistivity generally within a range of $10^{-3}$ to $10^{11}$ $\Omega$cm.

Examples of resistivity regulating agent to be added in a suitable amount to achieve the resistivity as explained above in the liquid recording medium are inorganic salts such as ammonium chloride, sodium chloride, potassium chloride etc., water-soluble amines such as triethanolamine etc., and quaternary ammonium salts.

In case of recording wherein the droplets are not charged, the resistivity of recording medium need not be controlled.

As a particularly preferable third component, there may be mentioned conventional wetting agents.

Examples of such wetting agent are polyalkylene glycols such as polyethylene glycol, polypropylene glycol etc.; alkylene glycols containing 2 to 6 carbon atoms such as ethylene glycol, propylene glycol, butylene glycol, hexylene glycol etc.; lower alkyl ethers of diethylene glycol such as ethyleneglycol methylether, diethyleneglycol methylether, diethyleneglycol ethylether etc.; glycerin; lower alkoxy triglycols such as methoxy triglycol, ethoxy triglycol etc.; N-vinyl-2-pyrrolidone oligomers etc.

As amount of the wetting agent may be optionally selected so as to impart desired characteristics. It is usually 0.01–0.9 parts by weight, preferably 0.02–0.8 parts by weight, and more preferably 0.05–0.7 parts by weight per one part by weight of the liquid recording medium.

The above-mentioned wetting agents may be used, in addition to single use, as a mixture of two or more compounds as long as they do not undesirably affect each other.

In addition to the above mentioned various additives, the liquid recording medium according to the present invention may contain a water soluble polymer such as polyvinyl alcohol and the like for the purpose of improving film-shapeability when adhered to a recording member, in particular, to obtaining a high film strength.

In order to produce a liquid recording medium possesing the above mentioned various recording characteristics, the liquid recording medium according to the present invention may be formulated is such a way that viscosity, surface tension, pH, resistivity in case of utilizing charged liquid droplets, and specific heat, thermal expansion coefficient and thermal conductivity in case of utilizing thermal energy for recording are within particular ranges.

The above mentioned characteristics are closely connected to stability of droplet formation, signal responsiveness and fidelity, image density, chemical stability, fluidity in the conduit of the device and the like. Therefore, it is necessary to take the characteristics into consideration upon formulating the liquid recording medium.

It is recommended to select the values of characteristics as shown in Table 1 below. However, it is not always necessary to the values for all the characteristics mentioned in Table 1, but it is sufficient to select the values for some of the characteristics mentioned in Table 1 depending upon the requested recording characteristics.

TABLE 1

| Physical property (unit) | Usually | Preferably | More preferably |
|---|---|---|---|
| Viscosity at 20° C. (Centi poise) | 0.3–30 | 1–20 | 1–10 |
| Surface tension (dyn/cm) | 10–70 | 10–60 | 15–50 |
| pH | 6–12 | 8–11 | |
| Resistivity* (Ohm · cm) | $10^{-3}$–$10^{11}$ | $10^{-2}$–$10^{3}$ | |
| Specific heat (J/g · °K.) | 0.1–4.0 | 0.5–2.5 | 0.7–2.0 |
| Thermal expansion coefficient ($\times 10^{-3}$deg$^{-1}$) | 0.1–1.8 | 0.5–1.5 | |
| Thermal conductivity ($\times 10^{-3}$W/cm · deg) | 0.1–50 | 1–10 | |

*The condition is employed when the liquid recording medium is used in the charged state.

EXAMPLE 1

| | | |
|---|---|---|
| Deionized water | 68.5 parts by weight | |
| Glycerine | 30 parts by weight | |
| Dye compound No. 1 | 1.5 parts by weight | |

The above ingredients were charged into a vessel having a stirrer and mixed to form a uniform solution avoiding that air got mixed with the solution.

The resulting solution was filtered through a glass filter having hole diameter of 0.5 microns and then degassed for one hour by a rotary pump. 30 ml of the solution thus degassed was placed in a cassette vessel of polyvinyl chloride and sealed (Sample $A_1$). This cassette vessel was set in an ink jet recording device of an demand type having a recording head comprising a nozzle having an orifice for ejecting the liquid recording medium and surrounded in a closely contacted state with a cylindrical piezoelectric element.

And tests $T_1$, $T_2$ and $T_3$ were conducted under the recording conditions in Table 2. There were obtained recorded images of a high quality. In particular, non-continuous recording was effected 30 times in test $T_2$ and images recorded from the beginning of recording to the end of recording had very good quality.

TABLE 2

| | |
|---|---|
| Orifice diameter | 60 microns |
| Conditions for driving piezoelectric element | 30V, 15 μsec. |
| Maximum response frequency | 68 KHz |
| Recording member | High grade paper (86.5 Kg) (supplied by Sanyo Kokusaku Pulp Co., trade name, Ginkan A-Sheet) |
| Speed at which the recording member moves | 330cm/sec |

Test $T_1$: Continuously recording for 36 hours.
Test $T_2$: After conducting a continuous recording for 10 minutes, recording was stopped for one hour and this type of non-continuous recording was repeated.
Test $T_3$: After a continuous recording for 10 minutes, the recording was stopped for 24 hours and then the recording was repeated again.

EXAMPLE 2

| | |
|---|---|
| Deionized water | 23.5 parts by weight |
| Ethylene glycol | 75 parts by weight |
| Dye compound No. 4 | 1.5 parts by weight |

These materials were charged into a vessel having a stirrer and mixed to form a uniform solution avoiding that air got mixed with the solution.

The resulting solution was filtered through a glass filter having hole diameter of 0.5 microns and then degassed for one hour by a rotary pump. 30 ml. of the solution thus degassed was placed in a cassette vessel of polyvinyl chloride and sealed (Sample $A_2$). This cassette vessel was set in an ink jet recording device of on demand type having a recording head comprising a nozzle having an orifice for ejecting the liquid recording medium and surrounded in a closely contacted state with a cylindrical piezoelectric element.

And tests $T_1$, $T_2$ and $T_3$ shown in Example 1 were conducted under the recording conditions in Table 2. The recording were conducted stably as in Example 1. And images recorded from the beginning of recording to the end of the recording had very good quality.

Concentration of dye compound No. 4 was changed in a range from 0.1 to 10% by weight and surface tension of each of the liquid recording medium was measured and it was found that all the measured surface tension were 48–49 dyn/cm (25° C.).

This liquid recording medium was spotted to the above mentioned recording member and dried. This spotted image was measured with respect to reflection density by an optical densitometer to find 1.10. After this was soaked in top water for one hour, the reflection density was 1.04. That is, decrease in reflection density was very little. On the contrary, a liquid recording medium prepared by following the above mentioned procedures except that water-soluble nigrosine (C.I. 50420) was used in place of No. 4 dye compound was subjected to the same test as above. The original reflection density was 0.98 and after soaked in water, it became as low as 0.15. This comparison experiments show that water resistance of the liquid recording medium of the present invention is excellent.

EXAMPLE 3

Repeating the procedure of Example 1 except that dye compound Nos. 2, 4, 5, 7, 8, 10, 12, 14, 18, 20, 24, 28, 32, 37, 42, 43, 45, 47, 50, 53, 57, 58, 60, 62, 63, 65, 70, 73 and 80 were used in place of the dye compound used in Example 1, and each of the dye compounds was used in an amount of 0.1, 0.5, 1, 3, 5, 10 and 12% by weight of the total amount of the liquid recording medium, there were prepared liquid recording media.

The resulting liquid recording media were subjected to tests $T_1$, $T_2$ and $T_3$ under the conditions of Table 2 and the recording media gave stable and excellent recorded images.

In test $T_2$ repeated 30 times, the resulting image quality was constant and excellent from the beginning of recording to the end of recording.

Before conducting the test, surface tension of each of the liquid recording media was measured and it was found that these liquid recording media show substantially the same value of surface tension. The difference of the values was only within the range of error of measurement. This indicates that the surface tension is hardly changed by change of concentration of the recording agent. Therefore, it is possible to produce a liquid recording medium having almost the same liquid physical properties even if concentration of the recording agent is varied. Further, the resulting liquid recording media prepared by changing concentration of the recording agent can have excellent recording characteristics.

EXAMPLE 4

With the components and weight ratio as shown in Table 3, liquid recording media according to the present invention, $A_{4a}$–$A_{4f}$, were formulated and subjected to test $T_1$–$T_3$ under the conditions of Table 2 by using the device as used in Example 1. All of the samples gave always stable recording and the resulting recorded images whether they are obtained at the beginning or at the end of recording, were sharp and of high contrast, high image density and high quality.

TABLE 3

| Sample No. | Dye compound No.* | Main carrier liquid* | Additives | |
|---|---|---|---|---|
| $A_{4a}$ | 6(7) | Water (90) | Polyvinyl alcohol | (3) |
| | | | Methyl cellulose | |
| $A_{4b}$ | 13(4.9) | Water (85) + ethyl alcohol (10) | Polyoxyethylene lauryl ether (tradename, Emulgen 108, supplied by Kao Sekken Co.) (0.1) | |
| $A_{4c}$ | 29(3.99) | Water (96) | Polyoxyethylene sorbitan tricleate (tradename. Tween 85, supplied by Kao Sekken Co.) (0.01) | |
| $A_{4d}$ | 40(2) | Water (68) | Ethyleneglycol methyl ether (30) | |
| $A_{4e}$ | 55(2) | Water (70) | Polyvinyl alcohol Ethyleneglycol methyl ether (25) | (3) |
| $A_{4f}$ | 75(3) | Water | Polyvinyl alcohol | (2) |

TABLE 3-continued

| Sample No. | Dye compound No.* | Main carrier liquid* | Additives |
|---|---|---|---|
| | | (70) | Ethyleneglycol (25) |

*Values in parentheses are in % by weight.

What we claim is:

1. In an ink jet recording process for discharging a liquid recording medium in the form of droplets for recording from a discharge orifice in a recording head, the improvement which comprises employing a liquid recording medium comprising:
   (a) a carrier liquid selected from the group consisting of water and a mixture of water and a water-soluble organic solvent; and
   (b) a recording agent having the formula

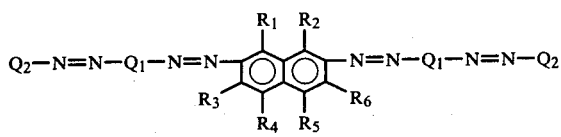

wherein said recording agent has 2–8 sulfo groups per molecule, each in the form of a sodium salt or quaternary ammonium salt and wherein the $Q_1$ radicals are similar or dissimilar members selected from the group consisting of phenylene and naphthalene, the $Q_2$ radicals are similar or dissimilar members selected from the group consisting of phenyl and naphthyl, the $Q_1$ radicals and the $Q_2$ radicals may be unsubstituted or amino substituted, hydroxyl substituted or sulfo substituted, and $R_1$–$R_6$ are similar or dissimilar members selected from the group consisting of hydrogen, amino, hydroxyl and sulfo.

2. A liquid recording process according to claim 1 in which the content of the compound (A) is 0.1–15% by weight based on the total weight of the liquid recording medium.

3. A liquid recording process according to claim 1 in which the content of the compound (A) is 0.5–10% by weight based on the total weight of the liquid recording medium.

4. A liquid recording process according to claim 1 in which the content of the compound (A) is 1–5% by weight based on the total weight of the liquid recording medium.

5. A liquid recording process according to claim 1 in which the compound (A) has 3–8 sulfo groups in the form of sodium salt or quaternary ammonium salt.

6. A liquid recording process according to claim 1 in which sulfo groups in the form of sodium salt or quaternary ammonium salt attach to the central naphthalene ring and these sulfo groups attach to symmetrical positions.

7. A liquid recording process according to claim 1 in which the compound (A) has the sulfo groups in the form of sodium salt or quaternary ammonium salt attaching to the central naphthalene ring all at the same side with respect to the long molecular axis.

8. A liquid recording process according to claim 1 in which $Q_1$ is phenylene having sulfo in the form of sodium salt or quaternary ammonium salt.

9. A liquid recording process according to claim 1 in which the sulfo groups are in the form of a quaternary ammonium salt having a group selected from $C_1$–$C_5$ alkyl, —$C_2H_4OH$ and

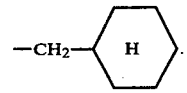

10. In an ink jet recording process for discharging a liquid recording medium in the form of droplets for recording from a discharge orifice in a recording head, the improvement which comprises employing a liquid recording medium comprising:
   (a) a carrier liquid selected from the group consisting of water and a mixture of water and a water-soluble organic solvent; and
   (b) a recording agent having the formula

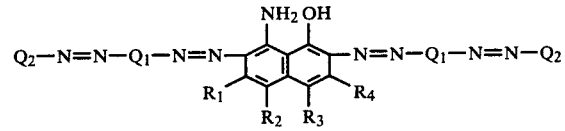

wherein said recording agent has 2–8 sulfo groups per molecule, each in the form of a sodium salt or quaternary ammonium salt and wherein the $Q_1$ radicals are similar or dissimilar members selected from the group consisting of phenylene and naphthalene, the $Q_2$ radicals are similar or dissimilar members selected from the group consisting of phenyl and naphthyl, the $Q_1$ radicals and the $Q_2$ radicals may be unsubstituted or amino substituted, hydroxyl substituted or sulfo substituted, and $R_1$–$R_4$ are similar or dissimilar members selected from the group consisting of hydrogen and sulfo.

11. The liquid recording process according to claim 10 in which the content of said recording agent is 0.1–15% by weight based on the total weight of the liquid recording medium.

12. The liquid recording process according to claim 10 in which the content of said recording agent is 0.5–10% by weight based on the total weight of the liquid recording medium.

13. The liquid recording process according to claim 10 in which the content of said recording agent is 1–5% by weight based on the total weight of the liquid recording medium.

14. The liquid recording process according to claim 10 in which said recording agent has 3–8 sulfo groups in the form of a sodium salt or a quaternary ammonium salt.

15. The liquid recording process according to claim 10 in which sulfo groups in the form of a sodium salt or a quaternary ammonium salt are attached to the central naphthalene ring and these sulfo groups attached to symmetrical positions.

16. The liquid recording process according to claim 10 in which said recording agent has the sulfo groups in the form of a sodium salt or a quaternary ammonium salt attached to the central naphthalene ring at the same side with respect to the long molecular axis.

17. The liquid recording process according to claim 10 in which $Q_1$ is phenylene having sulfo in the form of a sodium salt or quaternary ammonium salt.

18. The liquid recording process according to claim 10 in which the sulfo groups are in the form of a quaternary ammonium salt having a group selected from $C_1$–$C_5$ alkyl, —$C_2$—$H_4$OH and
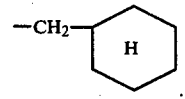
* * * * *

UNITED STATES PATENT AND TRADEMARK OFFICE
CERTIFICATE OF CORRECTION

PATENT NO. : 4,395,288

DATED : July 26, 1983

INVENTOR(S) : TSUYOSHI EIDA, ET AL.

It is certified that error appears in the above-identified patent and that said Letters Patent is hereby corrected as shown below:

Columns 17-18, the right-hand portion of formula No. 60 should read:

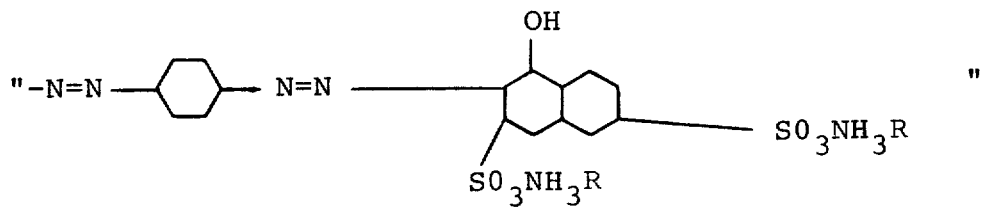

in the legend for formula No. 63, change "$R^3 = - CH_2)_3 CH_3$" to "$R^3 = - (CH_2)_3 CH_3$"

in the legend for formula No. 64, change "$R = -(CH_2)_3 CH_3$" to "$R = - (CH_2)_5 CH_3$"

UNITED STATES PATENT AND TRADEMARK OFFICE
CERTIFICATE OF CORRECTION

PATENT NO. : 4,395,288

DATED : July 26, 1983

INVENTOR(S) : TSUYOSHI EIDA, ET AL.

It is certified that error appears in the above-identified patent and that said Letters Patent is hereby corrected as shown below:

in the legend for formula No. 65, change "R= $-CH_2CH_2CH$"

to "R= $-CH_2CH_2OH$ "

Columns 19-20, the left-hand portion of formula No. 67 should read:

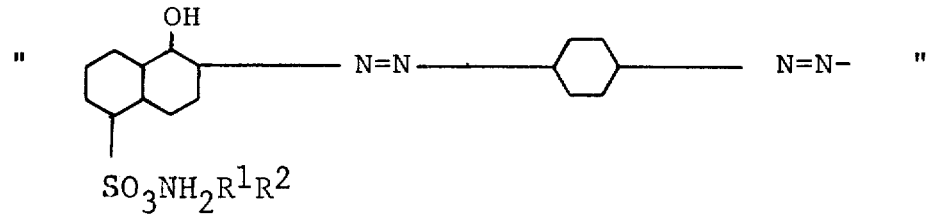

UNITED STATES PATENT AND TRADEMARK OFFICE
CERTIFICATE OF CORRECTION

PATENT NO. : 4,395,288
DATED : July 26, 1983
INVENTOR(S) : TSUYOSHI EIDA, ET AL.

It is certified that error appears in the above-identified patent and that said Letters Patent is hereby corrected as shown below:

in the legend for formula No. 68, change " R= $-(CH_2)_3 CH_3$ " to "R= $-(CH_2)_5 CH_3$ "

Column 28, line 2, change "to" to --of--

Column 29, Table 2, change "60 mictons" to -- 60 microns --

Signed and Sealed this

Thirty-first Day of July 1984

[SEAL]

Attest:

GERALD J. MOSSINGHOFF

Attesting Officer

Commissioner of Patents and Trademarks